United States Patent
Liu et al.

(10) Patent No.: US 10,725,881 B2
(45) Date of Patent: Jul. 28, 2020

(54) METHOD FOR LOCATING AND ISOLATING FAILED NODE OF ELECTROMECHNICAL MANAGEMENT BUS IN COMMUNICATION DEVICE

(71) Applicant: FIBERHOME TELECOMMUNICATION TECHNOLOGIES CO., LTD, Wuhan (CN)

(72) Inventors: Ping Liu, Wuhan (CN); Zebin Lei, Wuhan (CN); Cuimei Liu, Wuhan (CN); Linyin Song, Wuhan (CN)

(73) Assignee: FIBERHOME TELECOMMUNICATION TECHNOLOGIES CO., LTD, Wuhan (CN)

( * ) Notice: Subject to any disclaimer, the term of this patent is extended or adjusted under 35 U.S.C. 154(b) by 319 days.

(21) Appl. No.: 15/744,806

(22) PCT Filed: Oct. 21, 2016

(86) PCT No.: PCT/CN2016/102817
§ 371 (c)(1),
(2) Date: Jan. 14, 2018

(87) PCT Pub. No.: WO2017/118152
PCT Pub. Date: Jul. 13, 2017

(65) Prior Publication Data
US 2019/0012246 A1  Jan. 10, 2019

(30) Foreign Application Priority Data
Jan. 7, 2016  (CN) .......................... 2016 1 0007698

(51) Int. Cl.
G06F 11/22  (2006.01)

(52) U.S. Cl.
CPC ........ *G06F 11/2294* (2013.01); *G06F 11/221* (2013.01); *G06F 11/2257* (2013.01)

(58) Field of Classification Search
CPC .. G06F 11/2294; G06F 11/221; G06F 11/257; G06F 11/3027
See application file for complete search history.

(56) References Cited

U.S. PATENT DOCUMENTS

| 5,421,002 A | * | 5/1995 | Lee | ...................... G06F 11/2007 714/43 |
| 2002/0108076 A1 | * | 8/2002 | Barenys | ................ G06F 11/221 714/43 |

(Continued)

FOREIGN PATENT DOCUMENTS

| CN | 101291261 A | 10/2008 |
| CN | 102724093 A | 10/2012 |
| CN | 105577447 A | 5/2016 |

*Primary Examiner* — Yolanda L Wilson
(74) *Attorney, Agent, or Firm* — Bayramoglu Law Offices LLC

(57) ABSTRACT

A method for locating and isolating a failed node of an electromechanical management bus in a communication device. The method includes, in a communication process, an SHMC in operation records communication states of electromechanical management buses; the SHMC in operation performs calculation and analysis operations on data associated with the communication states, and determines whether there is an irrecoverable communication abnormality in a corresponding bus; if so, the SHMC sends, by means of a normal electromechanical management bus, a command to an electromechanical management node subordinate to the abnormal electromechanical management bus, such that the electromechanical management node controls a corresponding mechanical switch of the bus, coordinates respective nodes of the abnormal electromechanical management bus to conduct mutual communication tests with each other, (Continued)

locates a failed node, and returns location information of the failed node.

6 Claims, 4 Drawing Sheets

(56) References Cited

U.S. PATENT DOCUMENTS

| | | | | |
|---|---|---|---|---|
| 2012/0076003 A1* | 3/2012 | Wong | ............... | H05K 7/1459 370/242 |
| 2016/0178683 A1* | 6/2016 | Ramey | ............... | G01R 31/50 324/538 |
| 2016/0210255 A1* | 7/2016 | Wicki | ............... | G06F 13/4022 |

* cited by examiner

S100

In a communication process, an SHMC in operation records communication states of electromechanical management buses

S200

The SHMC in operation performs calculation and analysis operations on data associated with the recorded communication states, and determines whether there is an irrecoverable communication abnormality in a corresponding electromechanical management bus

S300

If so, the SHMC sends, by means of a normal electromechanical management bus, a command to an electromechanical management node of the abnormal electromechanical management bus, such that the electromechanical management node controls a corresponding mechanical switch of the bus, coordinates respective nodes of the abnormal electromechanical management bus to conduct mutual communication tests with each other, locates a failed node and returns a board number and a slot number of the failed node

S400

The SHMC in operation sends, to a remote network management system, and by means of a remote network management interface, an abnormality warning of the electromechanical management bus and the board number and the slot number of the failed node causing the abnormality for display, so as to realize remote warning and locating indication

FIG.3

S301
The SHMC in operation starts an electromechanical management bus abnormality locating procedure when the SHMC determines that there is an irrecoverable communication abnormality in an electromechanical management bus

S302
The SHMC in operation sends, by an electromechanical management bus which performs normal communication, a bus-off command to all electromechanical management nodes of the abnormal electromechanical management bus

S303
The electromechanical management nodes control mechanical switches to be off, thereby separating from the abnormal electromechanical management bus

S304
The SHMC in operation confirms that all electromechanical management nodes are separate from the abnormal electromechanical management bus, and selects two slot individual boards from an electromechanical management node registry

S305
The SHMC in operation sends, via the normal electromechanical management bus, an abnormal electromechanical management connection command to the individual boards

S306
The IPMC or SHMC of a selected board drives a mechanical switch to be on, thereby establishing a connection with the abnormal electromechanical management bus

S307
The SHMC in operation confirms that the two selected individual boards are connected to the abnormal electromechanical management bus, sends a communication test command with the communication address information of the IPMC or SHMC of one of the individual boards to the IPMC or SHMC of the other individual board

S308
The IPMC or SHMC of the selected individual board that receives the communication test command sends a communication test command receiving a response to the SHMC in operation, the abnormal electromechanical management bus, sends test data according to the communication address information in the communication test command, and waits for a response from the opposite party

S309
The SHMC in operation sends a communication test result acquisition command to the IPMC or SHMC of the selected individual board that starts the communication test, and receives the response data of communication between the IPMC or SHMC of the selected individual board and the IPMC or SHMC of the other selected board

S310 The SHMC in operation determines whether there is an abnormal electromechanical management bus circuits between the IPMC or SHMC of two individual boards that are connected to the abnormal electromechanical management bus according to the received communication test result response data — N

S311
The SHMC in operation re-selects two boards from the electromechnical management node registry

S312
The SHMC in operation selects one of the boards that perform communication successfully as a normal node, performs the communication test on the other from the electromechanical management node until all electromechanical management nodes of the abnormal electromechanical management bus complete the communication test, and screens nodes causing electromechanical management bus abnormalities

FIG.4

METHOD FOR LOCATING AND ISOLATING FAILED NODE OF ELECTROMECHNICAL MANAGEMENT BUS IN COMMUNICATION DEVICE

CROSS REFERENCE TO RELATED APPLICATIONS

This application is the national phase of International Application No. PCT/CN2016/102817, filed on Oct. 21, 2016, which is based upon and claims priority to Chinese Patent Application No. 201610007698.9, filed on Jan. 7, 2016, the entire contents of which are incorporated herein by reference.

TECHNICAL FIELD

The present invention relates to communication equipment, specifically to a method for locating and isolating a failed node of an electromechanical management bus in a communication device.

BACKGROUND

Power consumption of a communication device continuously rises as the capacitance of the communication device gradually increases, making the power supply and heat dissipation of the communication device increasingly complicated. In order to better realize electromechanical functions of the communication device such as power supply and heat dissipation, the communication equipment is configured with an electromechanical management system special for the electromechanical management of the communication device.

FIG. 1 shows a block diagram of an electromechanical management system based on an electromechanical management bus. The electromechanical management system is realized on the basis of the serial buses of two paths of individual software, for example I2C bus and CAN bus. This solution has a few serial bus signal wires and is conveniently realized, and the communication rate may also meet the requirements of electromechanical data transmission. However, the serial bus has the problem that nodes may fail and affect the communication of all bus nodes, for example, damage of an interface chip of a single mode bus and grounding short-circuit will result in a failure of communication between a bus controller and a bus protection circuit. In order to improve the reliability of the electromechanical management system, a traditional method is to start two groups of serial buses at the same time and the two paths of the buses serve as a stand-by of each other. Such method may improve the usability of the bus, but when one of the buses is abnormal, it fails to locate and isolate the damaged node and all boards of the communication equipment need to be checked manually, thus not only resulting in human resource waste, but also affecting the equipment operations

SUMMARY OF THE INVENTION

The technical problem to be solved by the present disclosure is to overcome the problem that an existing electromechanical management system fails to locate and isolate failed nodes after the communication of the electromechanical management bus becomes abnormal.

In order to solve the above technical problems, the present disclosure adopts a technical solution of providing a method for locating and isolating a failed node of an electromechanical management bus in a communication device. The method includes the following steps:

step 100, in a communication process, an SHMC in operation records communication states of electromechanical management buses;

step 200, the SHMC in operation performs calculation and analysis operations on data associated with the recorded communication states, and determines whether there is an irrecoverable communication abnormality in a corresponding electromechanical management bus;

step 300, if so, the SHMC sends, by means of a normal electromechanical management bus, a command to an electromechanical management node of the abnormal electromechanical management bus, such that the electromechanical management node controls a corresponding mechanical switch of the bus, coordinates respective nodes of the abnormal electromechanical management bus to conduct mutual communication tests with each other, locates a failed node and returns a board number and a slot number of the failed node;

step 400, the SHMC in operation sends, to a remote network management system, and by means of a remote network management interface, an abnormality warning of the electromechanical management bus and the board number and the slot number of the failed node causing the abnormality for display so as to realize remote warning and locating indication.

According to the above mentioned method, the process of recording the communication states includes: the SHMC in operation performs, each time using an electromechanical management bus to start communication, an accumulation operation on a variable associated with the communication states according to the success or failure of the communication result wherein the variable associated with the communication states is the number of consecutive communication failures.

According to the above mentioned method, the process of determining whether or not there is an irrecoverable communication abnormality in a corresponding electromechanical management bus includes: determining the recorded data variable associated with the communication states and when the number of the consecutive communication failures, namely the variable associated with the communication states of the electromechanical management bus, reaches a specified threshold value, determining that there is an irrecoverable communication abnormality in the electromechanical management bus.

According to the above mentioned, the electromechanical management nodes of the abnormal electromechanical management bus include an IPMC node and a stand-by SHMC node.

According to the above mentioned method, step 300 specifically includes the following steps:

The method according to claim 4 is characterized in that step 300 specifically includes the following steps:

step 301, the SHMC in operation starts an electromechanical management bus abnormality locating procedure when the SHMC determines that there is an irrecoverable communication abnormality in an electromechanical management bus;

step 302, the SHMC in operation sends, by means of an electromechanical management bus which performs normal communications, a bus-off command to all electromechanical management nodes of the abnormal electromechanical management bus;

step 303, the electromechanical management nodes control mechanical switches to be off, thereby separating from the abnormal electromechanical management bus;

step 304, the SHMC in operation confirms that all electromechanical management nodes separate from the abnormal electromechanical management bus, and selects two slot individual boards from an electromechanical management node registry;

step 305, the SHMC in operation sends, via the normal electromechanical management bus, an abnormal electromechanical management connection command to the individual boards;

step 306, the IPMC or SHMC of a selected board drives a mechanical switch to be on, thereby establishing connection with the abnormal electromechanical management bus;

step 307, the SHMC in operation sends, after confirming that the two selected individual boards are connected to the abnormal electromechanical management bus, a communication test command with the communication address information of the IPMC or SHMC of one of the individual boards to the IPMC or SHMC of the other individual board;

step 308, the IPMC or SHMC of the selected individual board that receives the communication test command sends a communication test command receiving response to the SHMC in operation, and by the abnormal electromechanical management bus, sends test data according to the communication address information in the communication test command, and waits for a response from the opposite party;

step 309, the SHMC in operation sends a communication test result acquisition command to the IPMC or SHMC of the selected individual board that starts the communication test, and receives the response data of communication between the IPMC or SHMC of the selected individual board and the IPMC or SHMC of the other selected individual board;

step 310, the SHMC in operation determines whether or not there is an abnormal electromechanical management bus circuit between the IPMC or SHMC of two individual boards that are connected to the abnormal electromechanical management bus according to the received communication test result response data, and if so, executes step 311; or, the SHMC in operation executes step 312;

step 311, the SHMC in operation re-selects two boards from the electromechanical management node registry, and then executes step 305;

step 312, the SHMC in operation selects one of the boards that perform communication successfully as a normal node, performs the communication test on the other from the electromechanical management node until all electromechanical management nodes of the abnormal electromechanical management bus complete the communication test, and screens nodes causing electromechanical management bus abnormalities.

According to the above mentioned method, failed nodes causing electromechanical management bus abnormalities are locally warned with lit lights while an abnormality warning of an electromechanical management bus and the board number and the slot number of the failed nodes causing abnormalities are displayed in a remote network management system.

In the present disclosure, every electromechanical management node of the electromechanical management buses is serially accessed to the bus mechanical switch, so that the electromechanical management system can complete the communication tests of every electromechanical management node through control over the bus mechanical switch when there is an irrecoverable abnormality of one of the two paths of electromechanical management buses, thus enabling the electromechanical management system to automatically find communication abnormalities of the electromechanical management buses, and locating and isolating the electromechanical management node causing abnormalities in the bus. The failed nodes can be located without manual checks, not only effectively reducing the labor cost in the maintenance, but also improving the reliability of the electromechanical management system. Meanwhile, a remote network management system feeds, to the maintenance personnel, the information of an the electromechanical management node causing abnormalities in time, so that the maintenance personnel can perform timely and effective subsequent maintenance and eliminate faults.

BRIEF DESCRIPTION OF THE DRAWINGS

FIG. 3 is a flowchart of a method for locating and isolating a failed node of an electromechanical management bus in a communication device provided by the present disclosure;

FIG. 4 is a specific flowchart of step 300 in the present disclosure.

DETAILED DESCRIPTION OF THE INVENTION

The present invention is described in detail with reference to the attached drawings and embodiment.

Figure 1:
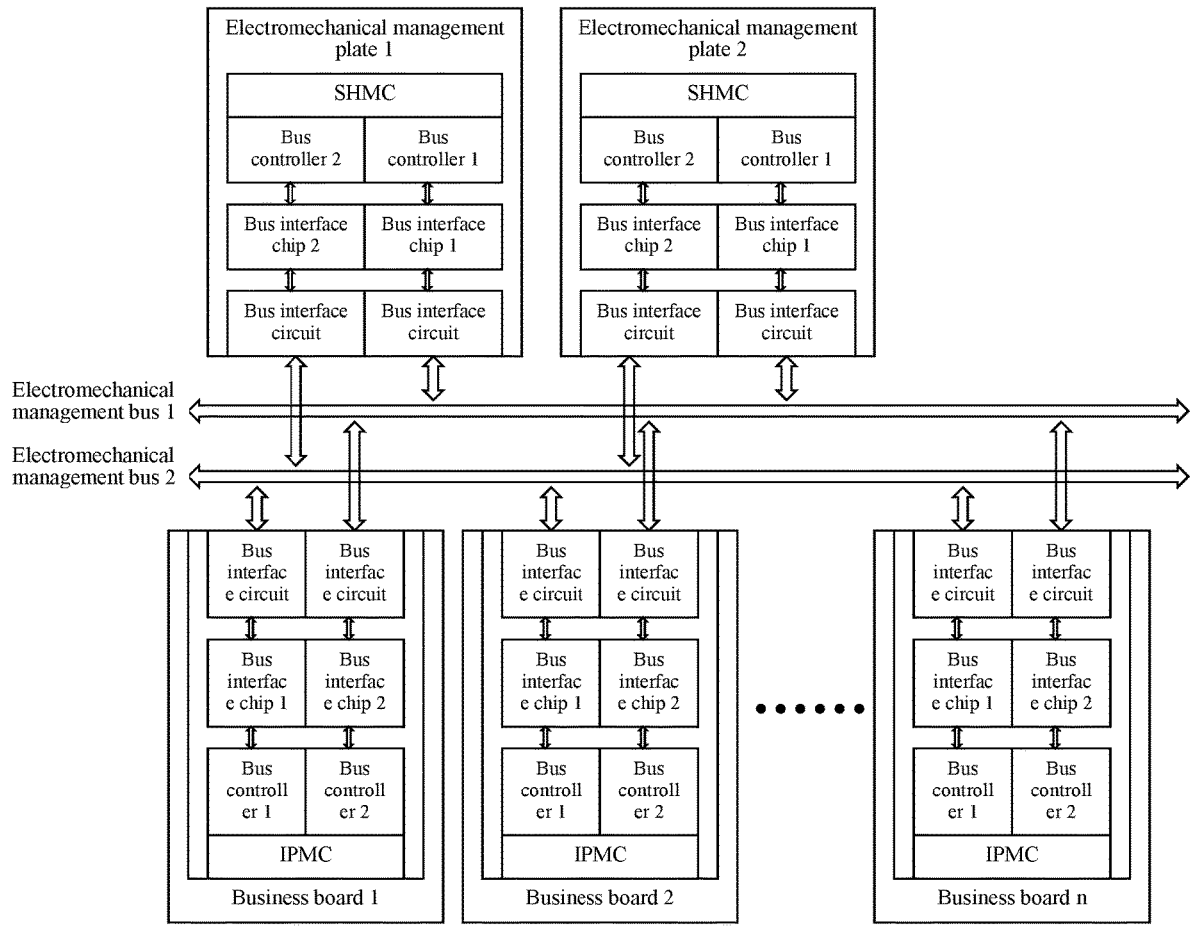
FIG. 1 is a block diagram of an electromechanical management system on the basis of an electromechanical management bus.
Figure 2:
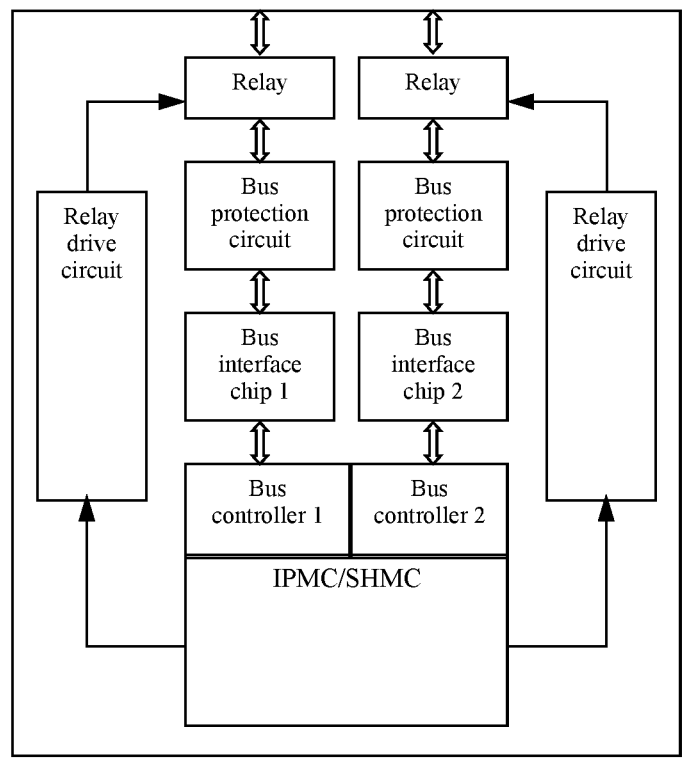
FIG. 2 is a block diagram of an electromechanical management node of an electromechanical management system in a communication device in the present disclosure.

FIG. 1 illustrates an electromechanical management system based on an electromechanical management bus. The electromechanical management bus interface circuit of the system is closer to the back plate end, and every electromechanical management node is not serially connected to a mechanical switch, so that when the physical layer of a bus interface chip is damaged, the electromechanical management node fails to separate from the bus. FIG. 2 is a block diagram of an electromechanical management node of an electromechanical management in a communication device in the present disclosure. Compared with FIG. 1, in this system, the end, closer to the back plate, of the electromechanical management bus interface circuit of each one of the electromechanical management nodes (including electromechanical management controller SHMC and intelligent controller IPMC) is connected with a controllable mechanical switch in series, and the mechanical switches are controlled by the IPMC or SHMC and utilize normally closed contacts, and he nodes are connected to the electromechanical management bus under the electrifying condition or under normal conditions; the SHMC and IPMC may control the mechanical switches to be off, so that the electromechanical management nodes separate from the physical layer of the electromechanical management bus.

The present invention provides a method for locating and isolating a failed node of an electromechanical management bus in a communication device, as shown in FIG. 3, including the following steps.

Step 100, in a communication process by using electromechanical management buses, an SHMC in operation records communication states of electromechanical management buses;

wherein the process of recording the communication states is as follows: an electromechanical management main node (the SHMC in operations) performs, each time using an electromechanical management bus to start communication, an accumulation operation on a variable (the number of consecutive communication failures) associated with the communication states according to the success or failure of the communication result.

Step 200, the SHMC in operation performs calculation and analysis operations on data associated with the recorded communication states, and determines whether there is an irrecoverable communication abnormality in a corresponding electromechanical management bus, which means that the electromechanical management main node fails, via the electromechanical management bus, accesses any electromechanical management node of the bus, and that abnormality is irrecoverable;

wherein the process of determining whether or not there is an irrecoverable communication abnormality in a corresponding electromechanical management bus includes: determining the recorded data variable associated with the communication states, and when the recorded communication state data show that the number of the consecutive communication failures, namely the variable associated with the communication states of the electromechanical management bus, reaches a specified threshold value, determining that there is an irrecoverable communication abnormality in the electromechanical management bus.

Step 300, if so, the SHMC in operation starts an electromechanical management bus abnormality locating procedure, sends, by means of an electromechanical management bus which performs normal communication, a command to an electromechanical management node (IPMC node and standby SHMC NODE) of the abnormal electromechanical management bus, such that the respective electromechanical management node controls respective corresponding mechanical switches of the bus to enable the respective bus interface circuits of electromechanical management nodes are connected to or separated from the abnormal electromechanical management bus via the physical layer, coordinate respective electromechanical management nodes of the abnormal electromechanical management bus to conduct mutual abnormal bus communication tests with each other, locate a failed node in the abnormal electromechanical management bus, and return a board number and a slot number of the failed node, thus locating the failed node (board) causing the abnormal electromechanical management abnormality.

Step 400, the SHMC in operation sends, to a remote network management system, and by means of a remote network management interface, an abnormality warning of the bus and the board number and the slot number of the failed board (failed node) causing the abnormality and the remote network management system receives the abnormality warning of the bus and the board number and the locating information (the board number and the slot number) of the failed board sent by the electromechanical management system, and displays the received information to realize locating and indicating the remote warning; meanwhile, the board causing the abnormality of the electromechanical management bus is displayed with a lit light for warning.

In the present invention, as shown in FIG. 4, step 300 specifically includes the following steps:

step 301, the SHMC in operation starts an electromechanical management bus abnormality locating procedure when the SHMC determines that there is an irrecoverable communication abnormality in an electromechanical management bus;

step 302, the SHMC in operation sends, by an electromechanical management bus which performs normal communication, a bus-off command to all electromechanical management nodes (including IPMC and SHMC) of the abnormal electromechanical management bus;

step 303, the respective electromechanical management nodes control mechanical switches to be off after receiving the bus-off command, thereby separating all electromechanical management nodes from the abnormal electromechanical management bus;

step 304, the SHMC in operation selects two slot hoards from an electromechanical management node registry corresponding to the abnormal electromechanical management bus, after confirming that all electromechanical management nodes separate from the abnormal electromechanical management bus;

step 305, the SHMC in operation, by means of the normal electromechanical management bus that performs normal communication, a command of connecting the abnormal electromechanical management bus to the two selected individual boards;

step 306, the IPMC or SHMC of the selected individual board drives a mechanical switch to be on after receiving the bus connection command, thereby establishing connection with the abnormal electromechanical management bus;

step 307, the SHMC in operation sends, after confirming that the two selected individual boards are connected to the abnormal electromechanical management bus, a communication test command to the IPMC or SHMC of the one individual board, wherein the command is attached with the communication address information of the IPMC or SHMC of the other individual board;

step 308, the IPMC or SHMC of the selected individual board that receives the communication test command sends a communication test command receiving response to the SHMC in operation, and by the abnormal electromechanical management bus, sends test data according to the communication address information in the communication test command, and waits for a response from the opposite party;

step 309, the SHMC in operation sends a communication test result acquisition command to the IPMC or SHMC of the selected individual board that starts the communication test, and receives the response data of communication between the IPMC or SHMC of the selected individual board and the IPMC or SHMC of the other selected individual board;

step 310, the SHMC in operation determines whether or not there is an abnormal electromechanical management bus circuit between the IPMC or SHMC of two individual boards that are connected to the abnormal electromechanical management bus according to the received communication test result response data, and if so, executes step 311; or the SHMC in operation executes step 312;

step 311, the SHMC in operation selects two individual boards again and then executes step 305 to perform the above mentioned communication test until finding two individual boards that perform the communication successfully;

step 312, the SHMC in operation selects one of the individual boards that perform communication successfully as a normal node, performs the communication test on the other from the electromechanical management node until all electromechanical management nodes of the abnormal electromechanical management bus complete the communication test, and screens nodes causing electromechanical management bus abnormalities.

Obviously, those skilled in this field can make various changes and modifications on the present invention on the basis of the concept and scope of the present invention. Thus, the intentions of the present invention are also included in those changes and modifications when those changes and modifications fall within the protective scope of the present invention.

What is claimed is:

1. A method for locating and isolating a failed node of an electromechanical management bus in a communication device, comprising the following steps:
   step (100), recording, in a communication process, by a Shelf Management Controller (SHMC) in operation, communication states of electromechanical management buses;
   step (200), performing, by the SHMC in operation, calculation and analysis operations on data associated with the recorded communication states, and determining whether there is an irrecoverable communication abnormality in a corresponding electromechanical management bus;
   step (300), if so, sending, by the SHMC, by means of a normal electromechanical management bus, a command to an electromechanical management node of the abnormal electromechanical management bus, such that the electromechanical management node controls a corresponding mechanical switch of the bus, coordinates respective nodes of the abnormal electromechanical management bus to conduct mutual communication tests with each other, locates a failed node and returns a board number and a slot number of the failed node;
   step (400), sending, by the SHMC in operation, to a remote network management system, by means of a remote network management interface, an abnormality warning of the electromechanical management bus and the board number and the slot number of the failed node causing the abnormality for display so as to realize remote warning and locating indication.

2. The method according to claim 1, wherein the process of recording the communication states is as follows:
   Performing, by the SHMC in operation, each time using the electromechanical management bus to start communication, an accumulation operation on a variable associated with the communication states according to the success or failure of the communication result wherein the variable associated with the communication states is the number of consecutive communication failures.

3. The method according to claim 2, wherein the process of determining whether or not there is an irrecoverable communication abnormality in a corresponding electromechanical management bus includes, determining the recorded data variable associated with the communication states, and when the number of the consecutive communication failures, namely the variable associated with the communication states of the electromechanical management bus, reaches a specified threshold value, determining that there is an irrecoverable communication abnormality in the electromechanical management bus.

4. The method according to claim 1, wherein the electromechanical management nodes of the abnormal electromechanical management bus include an Intelligent Platform Management Controller (IPMC) node and a standby SHMC node.

5. The method according to claim 4, wherein the step (300) specifically includes the following steps:
   step (301), starting, by the SHMC in operation, an electromechanical management bus abnormality locating procedure when the SHMC determines that there is an irrecoverable communication abnormality in an electromechanical management bus;
   step (302), sending, by the SHMC in operation, by an electromechanical management bus which performs normal communication, a bus-off command to all electromechanical management nodes of the abnormal electromechanical management bus;
   step (303), controlling, by the electromechanical management nodes, mechanical switches to be off, thereby separating from the abnormal electromechanical management bus;
   step (304), confirming, by the SHMC in operation, that all electromechanical management nodes are separate from the abnormal electromechanical management bus, and selecting two slot individual boards from an electromechanical management node registry;
   step (305), sending, by the SHMC in operation, via the normal electromechanical management bus, an abnormal electromechanical management connection command to the individual boards;
   step (306), driving, by the IPMC or SHMC of a selected board, a mechanical switch to be on, thereby establishing a connection with the abnormal electromechanical management bus;
   step (307), sending, by the SHMC in operation, after confirming that the two selected individual boards are connected to the abnormal electromechanical management bus, a communication test command with the communication address information of the IPMC or SHMC of one of the individual boards to the IPMC or SHMC of the other individual board;
   step (308), sending, by the IPMC or SHMC of the selected individual board that receives the communication test command, a communication test command receiving a response to the SHMC in operation; sending, by the abnormal electromechanical management bus, test data according to the communication address information in the communication test command, and waiting for a response from the opposite party;
   step (309), sending, by the SHMC in operation, a communication test result acquisition command to the IPMC or SHMC of the selected individual board that starts the communication test, and receiving the response data of communication between the IPMC or SHMC of the selected individual board and the IPMC or SHMC of the other selected individual board;
   step (310), determining, by the SHMC in operation, whether there is an abnormal electromechanical management bus circuit between the IPMC or SHMC of two individual boards that are connected to the abnormal electromechanical management bus according to the received communication test result response data, and if so, executing step (311); or, executing, by the SHMC in operation, step (312);
   step (311), re-selecting, by the SHMC in operation, two boards from the electromechanical management node registry, and then executes step (305);
   step (312), selecting, by the SHMC in operation, one of the boards that perform communication successfully as a normal node, performing the communication test on the other from the electromechanical management node until all electromechanical management nodes of the abnormal electromechanical management bus complete the communication test, and screening nodes causing electromechanical management bus abnormalities.

6. The method according to claim 1, wherein failed nodes causing electromechanical management bus abnormalities are locally warned with lit lights while an abnormality warning of an electromechanical management bus and the board number and the slot number of the failed nodes causing abnormalities are displayed in a remote network management system.

* * * * *